United States Patent [19]

Sato et al.

[11] Patent Number: 5,156,866
[45] Date of Patent: Oct. 20, 1992

[54] FLAVOR AND TASTE COMPOSITION FOR A CHEWING GUM

[75] Inventors: Yoshinori Sato, Saitama; Yoshihisa Suzuki, Kanagawa; Koji Ito, Saitama; Tatsuo Shinagawa, Tokyo, all of Japan

[73] Assignee: Lotte Company Limited, Tokyo, Japan

[21] Appl. No.: 707,007

[22] Filed: May 29, 1991

[30] Foreign Application Priority Data

Jun. 1, 1990 [JP] Japan ................. 2-141600

[51] Int. Cl.⁵ ............................. A23G 3/30
[52] U.S. Cl. ........................ 426/5; 426/96; 426/533; 426/534; 426/650
[58] Field of Search ........................ 426/3–6, 426/96, 533, 650, 534

[56] References Cited

U.S. PATENT DOCUMENTS 4,186,214  1/1980  Crouse III ................. 426/3

Primary Examiner—Jeanette Hunter
Attorney, Agent, or Firm—Young & Thompson

[57] ABSTRACT

There is disclosed a flavor and test composition for a chewing gum which has an effect of extending release of a flavor and taste of the chewing gum and is constructed by coating or melting and dispersing a flavor and taste substance which is an essence of expressing the flavor and taste, wherein a material used for the coating or the melting and dispersing of the flavor and taste substance is composed of a substance group comprising sterols as main ingredients. There is also disclosed a chewing gum which contains the above mentioned flavor and taste composition for a chewing gum.

14 Claims, 2 Drawing Sheets

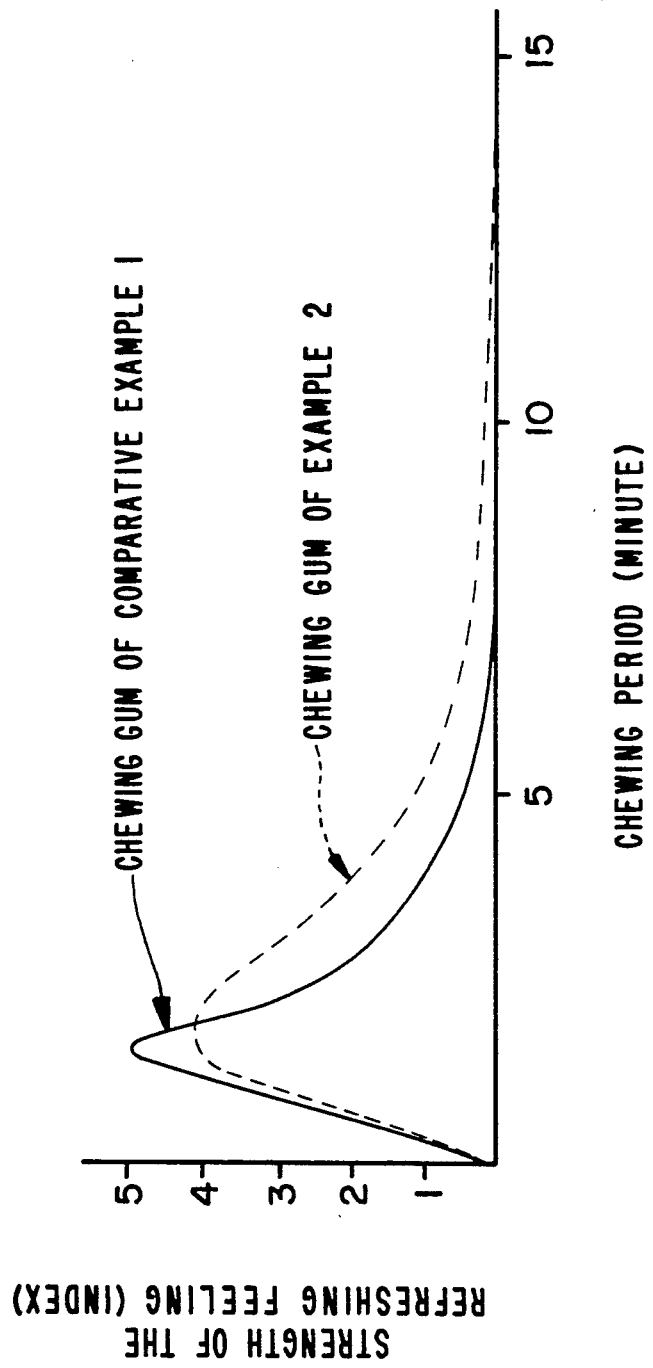

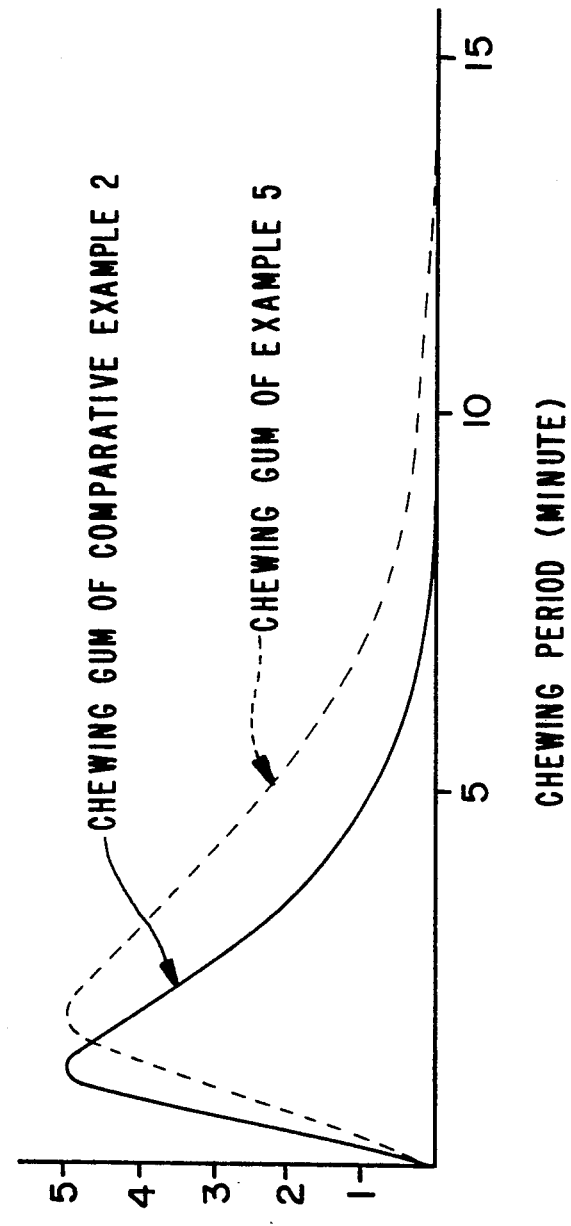

FLAVOR AND TASTE COMPOSITION FOR A CHEWING GUM

FIELD OF THE INVENTION

The present invention relates to a flavor and taste composition for a chewing gum and a chewing gum in which it is used, more particularly relates to a flavor and taste composition for a chewing gum which has an effect of extending release of a flavor and taste of the chewing gum and is constructed by coating or melting and dispersing a flavor and taste substance which is an essence for expressing the flavor and taste, wherein as a material used for the coating or the melting and dispersing of the flavor and taste substance is used a material belonging to a unique substance group, as well as to a chewing gum in which it is used.

BACKGROUND OF THE INVENTION

Chewing gum is basally constructed by using three components of (1) a gum base which is an insoluble component for serving as a base for chewing, (2) sugars which are soluble components for constructing a body and supplies a sweet taste, and (3) a flavor which characterizes a product thereof.

When the chewing gum is chewed, the sugars of (2) gradually dissolve in saliva in the mouth to release the sweet taste, however an ordinary gum elutes almost all of them after about five minutes, so that the sweet taste is lost thereafter, resulting in the state of so-called taste.

When a non-sugar strong sweetening substance having a tailing property in taste such as stevioside, aspartame and the like is used in addition to the sugars such as sugar, glucose, corn syrup and the like which are generally used, expression of the sweet taste is more or less extended, however, they are ultimately water soluble substances, so that there is a limitation in continuity.

On the other hand, the flavor of (3) has various types for using in the chewing gum, any one of which is an oily flavor which requires a tasty substance such as water soluble sweeteners or the like as a carrier for the taste for expressing the flavor in the mouth, and the sense of the flavor disappears simultaneously with completion of elution of them.

Therefore, in order to maintain the flavor and taste (which generally indicates the sense of the sweet taste, the sour taste, the salty taste, the nice taste, and the flavor) in the chewing gum, it is necessary to restrict the elution of such tasty substances and the flavor, especially the sweeter to be as slow as possible.

Conventional processed materials of sweeteners, flavors and the like directing to the maintenance of the flavor and taste are based on a method in which coating is done with a water soluble or insoluble substance, one in which adsorption to a porous carrier is done, one in which a substance for inhibiting dissolution is used and the like, among which the most effective for maintaining the flavor and taste is one in which coating is done with an insoluble substance. Concretely, in many cases, those which are used as a base material of the chewing gum or synthetic polymers other than the above are utilized, however, in fact, such drawbacks are listed that (1) processing is difficult to give an insufficient coating, (2) constituent components are too rigid to release the flavor and taste substance, (3) there is a sense of incompatibility from a viewpoint of feeling, (4) there is an incompatible taste, (5) there is a problem from a viewpoint of food hygiene and the like, so that one having sufficient quality has never been obtained.

SUMMARY OF THE INVENTION

The object of the present invention is to provide a flavor and taste composition for a chewing gum and a chewing gum in which it is used, wherein a substance having a suitable property as a coating material for the flavor and taste substance such as the tasty substance, the flavor or the like is used, the flavor and taste substance is rigidly held in a stage of product storage before chewing of the chewing gum, while the physical property thereof gradually changes after the start of chewing to gradually and continuously release the flavor and taste substance to give an effect of extending the release of the flavor and taste of the chewing gum, in which there is no sense of incompatibility and no incompatible taste from a viewpoint of feeling at all, and there is also no problem from a viewpoint of food hygiene.

According to the present invention, there is provided a flavor and taste composition for a chewing gum which has an effect of extending release of a flavor and taste of the chewing gum and is constructed by coating or melting and dispersing a flavor and taste substance which is an essence for expressing the flavor and taste, wherein a material used for the coating or the melting and dispersing of the flavor and taste substance is composed of a substance group comprising sterols as main ingredients.

According to the present invention, there is also provided a chewing gum which contains the above mentioned flavor and taste composition for a chewing gum.

BRIEF DESCRIPTION OF THE DRAWINGS

FIG. 1 is a figure showing maintenance property of the strength of a sweet taste of a chewing gum in which the flavor and taste composition for a chewing gum according to the present invention is used, and FIG. 2 is a figure showing maintenance property of the strength of refreshing feeling of mint of a chewing gum in which the flavor and taste composition for a chewing gum according to the present invention is used.

PREFERRED EMBODIMENT OF THE INVENTION

It is preferable that a weight ratio of the sterols to the flavor and taste substance is about 99:1 to 50:50.

If the ratio of the sterols is too high, it becomes difficult to release the flavor and taste substance, and no function as a flavor and taste donor can be provided. On the other hand, if the ratio is too low, there is a possibility that the coating becomes insufficient, and the enclosed flavor and taste substance is released with ease by chewing, so that no maintenance is provided. With respect to those having a high sensing threshold value such as strong sweetening substances and flavors, it is suitable that a ratio of the sterol to the flavor and taste substance is 99:1 to 70:30, preferably 95:5 to 90:10, and with respect to the sugars, is 80:20 to 50:50, preferably about 70:30 to 60:40.

It is preferable that the flavor and taste substance is primarily subjected to a mixing treatment such as coating, dispersing, adsorbing or the like together with a water soluble or insoluble material beforehand, which is further coated with the sterols.

As such water soluble or insoluble materials, for example, an inclusion compound such as β-cyclodextrin can be used.

With respect to the coating method, a method in which melted sterol is blown on flavor and taste substance particles to coat and mold, a method in which sterol in a melted state in which the flavor and taste substance particles are dispersed is converted into powder with an atomizer, a method in which the flavor and taste substance particles are dispersed in sterol dissolved in a solvent, after which the solvent is evaporated to give solidified one which is converted into powder and the like can be used, however, melting points of sterols are not less than 100° C., so that when a substance having poor heat stability is coated and dispersed, it is desirable that a softening agent such as edible oils and fats, an emulsifier, wax or the like is added to sterol to decrease the viscosity, or such a method is used in which sterol dissolved in a solvent is used, and the solvent is removed after processing. In addition, when flavor oil is used as an item, since the treatment is difficult, such a method can be adopted that the treatment is carried out once after the flavor is adsorbed and mixed with a gum material or a starch material to immobilize.

On the other hand, with respect to such a flavor and taste substance which has good heat stability and is compatible with the sterols, conversion into powder is performed by various methods after compatibly dispersing in a melted state, thereby the flavor and taste composition can be produced. In this case, from a viewpoint of the effect of maintenance, the ratio of sterol may be preferably higher than that in the case of coating.

It is preferable that the sterols are sterol compounds having a melting point not less than 100° C. in which a supplying source is animals and plants.

It is preferable that the sterols are a plant sterol (phytosterol).

It is preferable that with the sterols is mixed a softening agent in an amount not more than 50% by weight ratio selected from the group consisting of edible oils and fats, fatty acid glycerol ester, sucrose fatty acid ester, phospholipid, and wax to use.

It is preferable that the flavor and taste substance is a sugar sweetener selected from the group consisting of sugar, glucose, fructose, maltose, lactose, palatinose, oligosaccharides, sorbitol, mannitol, maltitol, xylitol, erythritol, palatinitol, and reduced starch hydrolysate.

It is preferable that the flavor and taste substance is a strong sweetening substance selected from the group consisting of stevioside, glycyrrhetin, dihydrochalcone, thaumatin, monellin, asparatame, alitame, acesulfame salt, saccharin salt, and cyclaminic acid salt.

It is preferable that the flavor and taste substance is a souring agent selected from the group consisting of citric acid, tartaric acid, malic acid, lactic acid, fumaric acid, adipic acid, and glucono delta lactone.

It is preferable that the flavor and taste substance is sodium chloride and/or potassium chloride.

It is preferable that the flavor and taste substance is an amino acid and/or a peptide.

It is preferable that the flavor and taste substance is spice for food.

Almost all sterols are integrated into the gum base after releasing the flavor and taste substance and remain in the mouth, however, there is a possibility that a part of them is orally absorbed. However, they are originally present in body lipid of animals and plants, and there is no problem in safety.

Sterols (sterins) are compounds having a steroid backbone and hydroxyl groups in a molecule, which are widely distributed in body lipid of general organisms as unsaponified substances together with tocopherol (vitamin E) and the like. According to a rough classification, they are originated from animals, plants, and microorganisms, and those from animals are represented by cholesterol which is major sterol of higher animals, and there are dehydrosterol, lanosterol, latosterol and the like. In addition, among sterols from plants, those originated from higher plants are generally called as phytosterol which is a mixture of cytosterol, campesterol, stigmasterol, brassicasterol and the like.

Their properties resemble each other, which generally provide the following characteristics.

Appearance: white crystalline powder.

Taste and odor: no taste and no odor.

Solubility: soluble in general organic solvents and in oils and fats, scarcely soluble in alcohol, insoluble in water.

Melting point: not less than 100° C.

The supply source of cholesterol is general oils and fats such as wool lipid, tallow, fish oil and the like, and the supply source of phytosterol is oily seeds such as rice bran, sesame, soybean, peanut and the like. Deodored eluents produced as byproducts during production steps of the oils and fasts are used as a raw material so as to extract and purify therefrom to produce.

With respect to physiological functions of sterols, for example, excess presence of cholesterol causes blood vessel deposition, however, they are essential substances for a human body as precursors of sex hormones and vitamins. The phytosterol especially relieves high cholesterol blood diseases, which is classified as a cholesterol control functional food. In addition, it has an effect of increasing bile apoproteins and inhibiting formation of gallstones.

As conventional uses of sterols, they were generally used as a material for synthesizing sex hormone substances, and used as a material of cosmetics.

The sterols are substances which are water insoluble and become soft by heat, so that they can be utilized as a tasty substance, a material for coating flavors, and a material of compatible dispersion. When a chewing gum in which they are used to blend the flavor and taste composition is chewed in the mouth, the sterol does not change at all at the early stage, and no flavor and taste substance is released, but it gradually swells by penetration of the saliva to have a suitable flexibility, and physical pressing by repeated chewing allows the flavor and taste substance to be released little by little. Thus, evident extension of the flavor and taste is found as compared with the conventional chewing gum, however, substantially no sense of incompatibility from a view of feeling and no incompatible taste is given due to the blending of this composition. In addition, a degree of maintenance property can be optionally controlled by changing the composition ratio of the sterol, or by blending a softening agent to the sterol to make the physical property soft.

The flavor and taste composition in which the sterols are used as a coating material or a material for compatible dispersion has a low hardness which is different from those in which a polymer such as vinyl acetate resin or the like is used, so that it has a good mouth-feel and gives no roughness unless the particle size is especially coarse. In addition, it is a water insoluble substance, so that it is stable without dissolving as a water soluble polymer such as a gum material, a starch material and the like, however, when staying in the mouth becomes long, it absorbs a part of water to give a swollen state to provide flexibility. Such one is not instantly broken even when pressing is applied by chewing, and the flavor and taste substance is never released rapidly, however, the flavor and taste substance is released in a manner of gradual squeezing, which is considered to provide an effect on extension of expressing.

According to the present invention, there are provided a flavor and taste composition for a chewing gum and a chewing gum in which it is used, wherein a substance group mainly comprising the sterols having a suitable property as a coating material for the flavor and taste substance such as the tasty substance, the flavor or the like is used, the flavor and taste substance is rigidly held in a stage of product storage before chewing of the chewing gum, while the physical property thereof gradually changes after the start of chewing to gradually and continuously release the flavor and taste substance to give an effect of extending the release of the flavor and taste of the chewing gum, in which there is no sense of incompatibility and no incompatible taste from a viewpoint of feeling at all, and there is also no problem from a viewpoint of food hygiene.

The present invention will be further explained according to examples hereinafter in detail, however, the present invention is not limited only to the following examples.

EXAMPLE 1

(flavor and taste composition)

Using a fluidized coating machine, with respect to about 15 parts of pulverized high purity stevioside, coating processing was carried out employing about 100 parts of coating substance which contained 90% of phytosterol melted at 30° C., and after cooling and arrangement of particles, a stevioside enclosed flavor and taste composition having an average particle size of 50 mesh was obtained. The weight ratio of phytosterol to stevioside of the composition was 90:10.

EXAMPLE 2 AND COMPARATIVE EXAMPLE 1

(chewing gum)

Chewing gums were produced according to the following formulations.

|  | Example 2 | Comparative example 1 |
| --- | --- | --- |
| Gum base | 25 parts | 25 parts |
| Sugar | 63 | 63 |
| Corn Syrup | 10 | 10 |
| Glycerol | 1 | 1 |
| Mint flavor | 0.8 | 0.8 |
| Flavor and taste composition of Example 1 | 0.25 | — |
| Stevioside | — | 0.025 |

The chewing gums of Example 2 and Comparative example 1 were chewed by five special panels with a frequency of 75 times per minute respectively, and the strength of a sweet taste of every one minute was indicated by an index so as to compare the elution property of the sweet taste. The result is shown in FIG. 1.

EXAMPLE 3

(powder flavor)

10 parts of a mint flavor was stirred and mixed with 40 parts of β-cyclodextrin, which was completely adsorbed to prepare a powder flavor.

EXAMPLE 4

(flavor and taste composition)

25 parts of the powder flavor of Example 3 was homogeneously dispersed in a melted mixture of 70 parts of phytosterol having 95% purity and 5 parts of MCT, which was made to be powder thereafter using an atomizer, and after cooling and arrangement of particles, a mint flavor enclosed flavor and taste composition having an average particle size of 50 mesh was obtained. The weight ratio of phytosterol to the mint flavor of the composition was 93:7.

EXAMPLE 5 AND COMPARATIVE EXAMPLE 2

(chewing gum)

Chewing gums were produced according to the following formulations.

|  | Example 5 | Comparative example 2 |
| --- | --- | --- |
| Gum base | 25 parts | 25 parts |
| Sugar | 63 | 63 |
| Corn syrup | 10 | 10 |
| Glycerol | 1 | 1 |
| Mint flavor | 0.6 | 0.6 |
| Flavor and taste composition of Example 1 | 0.2 | 0.2 |
| Flavor and taste composition of Example 4 | 2.4 | — |
| Powder flavor of Example 3 | — | 0.6 |

The chewing gums of Example 5 and Comparative example 2 were chewed by five special panels with a frequency of 75 times per minute respectively, and the strength of a refreshing feeling of mint of every one minute was indicated by an index so as to compare the maintenance property of the refreshing feeling of mint. The result is shown in FIG. 2.

According to the above results, it can be understood that the chewing gum in which the flavor and taste composition for a chewing gum according to the present invention is used gives continuous release of the flavor and taste as compared with the conventional chewing gum.

What is claimed is:

1. A flavor and taste composition for providing extended release flavor and taste to chewing gum, said composition comprising particles of a flavor and taste component coated with a sterol, said flavor and taste component comprising at least one flavoring agent selected from the group consisting of sugar, glucose, fructose, maltose, lactose, palatinose, oligosaccarides, sorbitol, mannitol, maltitol, xylitol, erythritol, palatinitol, reduced starch hydrolysate, stevioside, glycyrrhetin, dihydrochalcone, thaumatin, monellin, asparatame, alitame, acesulfame salt, saccharin salt, cyclaminic acid salt, citric acid, tartaric acid, malic acid, lactic acid, fumaric acid, adipic acid, glucono delta lactone, sodium chloride, potassium chloride, amino acid, peptide and food spices.

2. The flavor and taste composition for a chewing gum according to claim 1 wherein a weight ration of the sterol to said flavoring agent is about 99:1 to 50:50.

3. The flavor and taste composition for a chewing gum according to claim 2 wherein the sterol is a sterol compound having a melting point not less than 100° C. and derived from animals and plants.

4. The flavor and taste composition for a chewing gum according to claim 3, wherein the sterol is a plant sterol.

5. The flavor and taste composition for a chewing gum according to claim 2 further comprising up to about 50% by weight of a softening agent selected from the group consisting of edible oils and fats, fatty acid glycerol ester, sucrose fatty acid ester, phospholipid, and wax, said softening agent being admixed with said sterol.

6. The flavor and taste composition for a chewing gum according to claim 1 wherein the flavoring agent is a sugar sweetener selected from the group consisting of sugar, glucose, fructose, maltose, lactose, palatinose, oligosaccharides, sorbitol, mannitol, maltitol, xylitol, erythritol, palatinitol, and reduced starch hydrolysate.

7. The flavor and taste composition for a chewing gum according to claim 1 wherein the flavoring agent substance is a strong sweetening substance selected from the group consisting of stevioside, glycyrrhetin, dihydrochalcone, thaumatin, monellin, asparatame, alitame, acesulfame salt, saccharin salt, and cyclaminic acid salt.

8. The flavor and taste composition for a chewing gum according to claim 1 wherein the flavoring agent substance is a souring agent selected from the group consisting of citric acid, tartaric acid, malic acid, lactic acid, fumaric acid, adipic acid, and glucono delta lactone.

9. The flavor and taste composition for a chewing gum according to claim 1 wherein the flavoring agent substance is sodium chloride and/or potassium chloride.

10. The flavor and taste composition for a chewing gum according to claim 1 wherein the flavoring agent substance is an amino acid and/or a peptide.

11. The flavor and taste composition for a chewing gum according to claim 1 wherein the flavoring agent substance is spice for food.

12. A chewing gum which contains the flavor and taste composition for a chewing gum according to claim 1.

13. The flavor and taste composition for a chewing gum according to claim 1, wherein said particles are dispersed in a solution of said sterol.

14. The flavor and taste composition for a chewing gum according to claim 1, wherein said flavoring agent is an oil and wherein said oil is adsorbed on a carrier of β-cyclodextrin for form said particles.

* * * * *